United States Patent
Reiser et al.

[19]

[11] Patent Number: 6,125,339

[45] Date of Patent: *Sep. 26, 2000

[54] AUTOMATIC LEARNING OF BELIEF FUNCTIONS

[75] Inventors: Kurt Reiser, Torrance; Yang Chen, Westlake Village, both of Calif.; Todd L. Baker, Oro Valley, Ariz.

[73] Assignee: Raytheon Company, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/996,776

[22] Filed: Dec. 23, 1997

[51] Int. Cl.⁷ .................................................. G06F 101/14
[52] U.S. Cl. ......................... 702/181; 702/119; 702/123; 706/47
[58] Field of Search ..................... 702/108, 181, 702/119, 123, 120, 121, 122; 706/47, 48

[56] References Cited

U.S. PATENT DOCUMENTS

| | | |
|---|---|---|
| 4,649,515 | 3/1987 | Thompson et al. ..................... 364/900 |
| 4,754,410 | 6/1988 | Leech et al. ............................. 364/513 |
| 4,805,225 | 2/1989 | Clark ......................................... 706/20 |
| 5,123,057 | 6/1992 | Verly et al. ............................... 382/37 |
| 5,130,936 | 7/1992 | Sheppard et al. ....................... 702/123 |
| 5,339,256 | 8/1994 | Levy et al. .............................. 364/506 |
| 5,493,729 | 2/1996 | Nigawara et al. ......................... 395/61 |
| 5,778,157 | 7/1998 | Oatman et al. ........................... 395/51 |
| 5,787,885 | 8/1998 | Lemelson ................................. 128/632 |

*Primary Examiner*—Marc S. Hoff
*Assistant Examiner*—Bryan Bui
*Attorney, Agent, or Firm*—Leonard A. Alkov; William C. Schubert; Glenn H. Lenzen, Jr.

[57] ABSTRACT

A method providing automatic learning belief functions enabling the combination of different, and possibly contradictory information sources. The present invention provides the ability to determine erroneous information sources, inappropriate information combinations, and optimal information granularities, along with enhanced system performance.

20 Claims, 1 Drawing Sheet

AUTOMATIC LEARNING OF BELIEF FUNCTIONS

BACKGROUND OF THE INVENTION (a) Field of the Invention

The present invention relates generally to belief functions and, more specifically, to a method for automatically learning belief functions.

(b) Description of Related Art

A system may have multiple information sources which are used to make a decision. In a target recognition situation, the information source may take the form of a radar sensor/detector. For example, three different sensors may be used when attempting to distinguish targets from decoys. A complication arises when two of the sensors report that an object under surveillance is a target, and the third sensor reports that the object is a decoy. This complication must be resolved to accurately recognize the object.

The Dempster-Shafer theory of evidential reasoning, which is known to those skilled in the art, provides means of combining information from different, and possibly contradictory information sources. The Dempster-Shafer theory uses explicit representations of ignorance and conflict to avoid the shortcomings of classical Bayesian probability calculus. Dempster-Shafer theory uses belief functions (also called basic probability assignments or bpa's), which are generalizations of discrete probability functions used in Bayesian probability calculus. In Dempster-Shafer theory, bpa's represent the distribution of probability mass in a system (i.e, how strongly something is believed, based on the information that has been provided). Referring back to the target recognition problem, an example bpa for the sensor information available may be $\mu_1(\{\text{target}\})=0.55$, $(\{\text{target, decoy}\})=0.45$. This bpa represents the fact that 55% of the evidence from a set of sensors considered supports the conclusion that the observed object is a target, the remaining 45% remains uncommitted between the target and the decoy. Multiple sets of sensors may be used to measure various characteristics of an object. For example, the bpa $\mu_1$ may be based on sensors that determine the shape of the object being monitored. A second set of sensors used to produce $\mu_2$ may be based on object size, while a third bpa $\mu_3$ may be based on sensors that monitor the heat associated with the object. Each set of sensors is used to determine the identity of the object being observed by using different characteristics of the object. Each bpa represents a probability distribution as to the certainty of the identity of an object. Sets containing more than a single element (in this example, target and decoy) are used to represent ambiguity or confusion. Empty sets are used to represent conflict or disagreement of evidence. Belief functions may be combined to provide information for further conclusions. For example, bpa's generated based on size, shape, and heat may be combined to reach a decision on the identity of the object under surveillance.

Previous applications of Dempster-Shafer theory include expert systems, accounting systems, and sensor fusion. Despite previous applications and the utility of Dempster-Shafer theory, there is no automatic method for adjusting belief functions in a system. The ability to adjust the belief functions used in a system would allow the system to "learn" from the information provided by information sources. The ability of a system to automatically update belief functions would, in addition to improving the performance of the system, allows a system to determine erroneous information sources, inappropriate information combinations, and optimal information granularities. Therefore, there exists the need for a method of automatically updating belief functions.

SUMMARY OF THE INVENTION

The present invention provides a method for automatically learning belief functions, thus providing the ability to determine erroneous information sources, inappropriate information combinations, and optimal information granularities, along with enhanced system performance. The present invention may be embodied in a method of training belief functions, including the steps of gathering information representative of an object or event; creating a set of basic probability assignments based on said set of information; creating combinations of said basic probability assignments; measuring an error present in said basic probability assignments and said combinations of basic probability assignments; calculating updates of said basic probability assignments and said combinations of basic probability assignments based on said error; and modifying said basic probability assignments and said combinations of basic probability assignments with said updates.

The invention itself, together with further objects and attendant advantages, will best be understood by reference to the following detailed description, taken in conjunction with the accompanying drawings.

DESCRIPTION OF THE PREFERRED EMBODIMENTS

The ability to adjust, or train, belief functions based on information provided by information sources would be very useful. The ability of a system to automatically train belief functions would, in addition to improving the performance of the system, allow a system to determine erroneous information sources, inappropriate information combinations, and optimal information granularities.

Belief training includes both supervised and unsupervised learning. Supervised learning takes place when a desired bpa is known and an observed bpa is available. Unsupervised learning takes place when the desired bpa is not explicitly known, but some measurable quality or characteristic of a good bpa is known. Both supervised and unsupervised learning employ the same general method of learning. That is, each method of learning generates an error term based on observed bpa's and processes that error term to generate updates to the belief functions used by the system.

Figure 1:
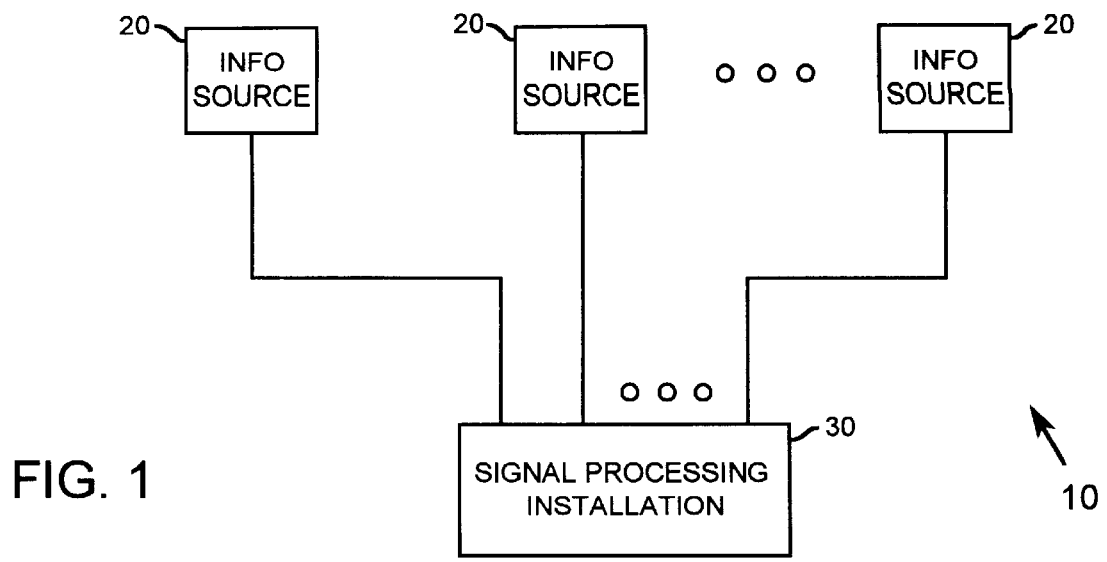
FIG. 1 is a diagram representing a hardware configuration that may be used with the present invention.

Referring now to FIG. 1, an information system 10 is shown. The information system 10 includes a number of information sources 20 and a signal processing installation 30. The information sources 20 may take a wide variety of forms including sensors capable of sensing an object or event and reporting information to the signal processing installation 30. Alternatively, the information sources 20 may be rules or opinions gathered from individuals, typically experts. The outputs of the information sources 20 are signals, which represent the event being observed. The outputs of the information sources 20 are coupled to the signal processing installation 30, which generates bpa's based on provided information and executes software implementing the method of the present invention.

Figure 2:
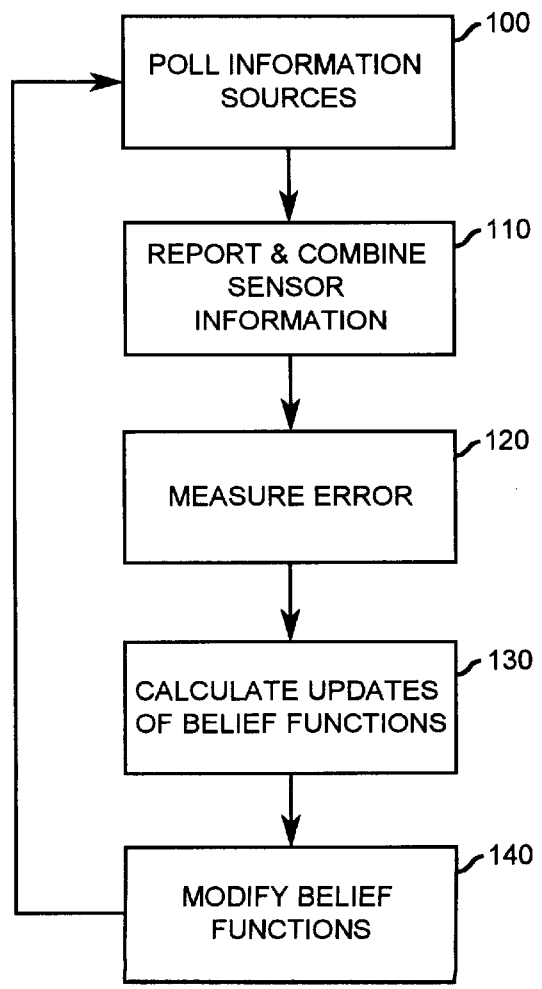
FIG. 2 is a flow diagram representing the method of the present invention.

FIG. 2 is a flow diagram of a method embodying the present invention. The flow diagram is generalized to apply to both supervised and unsupervised learning of belief functions. Any differences in the implementation method for supervised and unsupervised learning will be noted with respect to each step of the flow diagram. The method as described is executed by the signal processing installation 30, which may be implemented as a traditional computer or workstation terminal.

As shown in FIG. 2, at block 100 the method polls the information sources 20 to extract information. The extracted information will be used to generate a belief function, or bpa. The output of each information source 20 is representative of an observation, a rule, an opinion, or some other measurable phenomenon. The polling of the information source 20 is no different for supervised or unsupervised learning methods. Block 110 performs the function of gathering the information reported by the information sources 20, processing the information into bpa's, and combining the sensor bpa's in a predetermined fashion. For example, the bpa $\mu_1$ may be based on object shape. A second set of information sources 20, used to produce $\mu_2$ may be based on object size, while a third bpa $\mu_3$ may be based on the heat associated with the object. By combining the three bpa's ($\mu_1$, $\mu_2$, $\mu_3$) via Dempster's rule of combination, which is well known in the art, a fourth bpa ($\mu_o$) is created. This new bpa provides more information as to the identity of object being observed.

Block 120 then measures the error present in the bpa's based on the information from the information sources 20. The goal of both supervised and unsupervised learning is to minimize error in the bpa's. The calculation of error is performed differently for unsupervised and supervised learning applications. Additionally, the calculation of error is application dependent. That is, there are numerous ways to express error terms other than the ways shown below. In the case of supervised learning, where a desired bpa is known, the error term may consist of the observed results from the information sources 20 being subtracted from the desired results. This may be represented by E=$(\mu_d-\mu_o)^2$, where E is the error term, $\mu_d$ is the desired bpa, and $\mu_o$ is the combined bpa based on the information from the information sources 20.

Unsupervised learning relies on the qualities or characteristics of good bpa's, and not on known bpa's like supervised learning. Block 120 can calculate the error in the information through the use of various functions. Two examples of such functions are shown below in equations (1) and (2). Note that error calculations are application dependent and many other implementations of error calculations may be used.

$$E'(\mu) = 1 - \sum_{a \in W} \left[ \mu(a) \prod_{b \in W-\{a\}} (1 - \mu(b)) \right] \quad (1)$$

In equation (1), $\mu$ is the result of combining the bpa's of interest. The value of E' is minimum when all mass is devoted to one set containing a single element. For example, in equation (1) $\mu$(a) may be a target and $\mu$(b) may be a decoy, and both the target and the decoy are contained in set W. Accordingly, equation (2) below recites, $$E''(\mu) = \left[1 - \sum_{a \in W} q(a)\right]^2 + \sum_{a \in W} q(a)[1 - q(a)] \quad (2)$$

In equation (2), E'' is a minimum when all mass is devoted to a single element. The q(a) term is the commonality function of interest. For example, if three information sources produce three bpa's which are converted to commonality functions q1, q2, and q3, then q=q1q2q3.

After the error has been calculated, block 130 calculates the updates that need to be made to each belief function. The updates are based on the fact that minimal error is desired. The calculation of the updates may be made using partial differentiation with respect to the bpa being updated. For example, to train $\mu_1$ an update can be calculated using equation (3), which is commonly known as the gradient-descent rule.

$$\Delta \mu_1 = -\frac{\partial E}{\partial \mu_1} \quad (3)$$

In equation (3), E is the error term calculated using either unsupervised or supervised techniques. The calculation of error, partial derivatives, and updates are very application dependent and are not limited to the equations disclosed herein. By carrying out the partial differentiation shown in equation (3), the error term, which is composed of multiple bpa's (e.g., $\mu_1$, $\mu_2$, $\mu_3$), is differentiated with respect to one of the original bpa's (e.g., $\mu_1$) yielding the update that needs to be made to $\mu_1$ to minimize the error term (E).

After the bpa updates have been calculated, block 140 modifies the belief functions by adding the updates to the bpa's, and passing program control to block 100, which starts the learning process again.

Of course, it should be understood that a range of changes and modifications can be made to the preferred embodiment described above. For example, information sources in the system may be sensors or information such as rules or opinions, which may be gathered from experts. It is therefore intended that the foregoing detailed description be regarded as illustrative rather than limiting and that it be understood that it is the following claims, including all equivalents, which are intended to define the scope of this invention.

What is claimed is:

1. A method of recognizing an object, comprising the steps of:

gathering a set of information from a sensor, wherein said information is representative of a characteristic of said object;

creating Dempster-Shafer basic probability assignments (bpa's) based on said set of information, wherein said Dempster-Shafer bpa's represent a probability that said object comprises a target;

creating combinations of said Dempster-Shafer bpa's, wherein said combinations of said Dempster-Shafer bpa's represent the probability that said object comprises a target;

measuring an error present in said Dempster-Shafer bpa's and said combinations of said Dempster-Shafer bpa's;

calculating updates to said Dempster-Shafer bpa's and said combinations of said Dempster-Shafer bpa's based on said error; and refining said probability of said object comprising a target by modifying said Dempster-Shafer bpa's and said combinations of said Dempster-Shafer bpa's based on said updates.

2. The method of claim 1 wherein said set of information comprises rules.

3. The method of claim 1 wherein said set of information comprises opinions.

4. The method of claim 1 wherein said set of information comprises a size of an object.

5. The method of claim 1 wherein said set of information comprises a shape of an object.

6. The method of claim 1 wherein said set of information comprises heat associated with an object.

7. The method of claim 1 wherein said step of measuring error comprises a comparison between said Dempster-Shafer bpa's and a known desired result.

8. The method of claim 1 wherein said step of measuring error comprises a comparison between said combinations of said Dempster-Shafer bpa's and a known desired result.

9. The method of claim 1 wherein said step of measuring error comprises a comparison between said Dempster-Shafer bpa's and a set of characteristics of a desired result.

10. The method of claim 1 wherein said step of measuring error comprises a comparison between said combinations of said Dempster-Shafer bpa's and a set of characteristics of a desired result.

11. The method of claim 1 wherein said updates to said Dempster-Shafer bpa's are calculated using a gradient-descent rule.

12. An apparatus for recognizing an object comprising:

a signal processing unit;

a sensor that couples a set of information to said processing unit; and a memory in communication with said signal processing unit, said memory containing data representative of a process to be executed by said signal processing unit;

said process comprising the steps of:

i) gathering a set of information from said sensor, wherein said information is representative of a characteristic of said object ii) creating Dempster-Shafer basic probability assignments (bpa's) based on said set of information, wherein said Dempster-Shafer bpa's represent the probability that said object comprises a target;

iii) creating combinations of said Dempster-Shafer bpa's, wherein said combinations of said Dempster-Shafer bpa's represent a probability that said object comprises a target;

iv) measuring an error present in said Dempster-Shafer bpa's and said combinations of said Dempster-Shafer bpa's;

v) calculating updates to said Dempster-Shafer bpa's and said combinations of said Dempster-Shafer bpa's based on said error; and vi) refining said probability of said object being a target by modifying said Dempster-Shafer bpa's and said combinations of said Dempster-Shafer bpa's based on said updates.

13. The apparatus of claim 12 wherein said set of information comprises rules.

14. The apparatus of claim 12 wherein said set of information comprises opinions.

15. The apparatus of claim 12 wherein said error measurement comprises a comparison between said Dempster-Shafer bpa's and a known desired result.

16. The apparatus of claim 12 wherein said error measurement comprises a comparison between said combinations of Dempster-Shafer bpa's and a known desired result.

17. The apparatus of claim 12 wherein said error measurement comprises a comparison between said Dempster-Shafer bpa's and a set of characteristics of a desired result.

18. The method of claim 12 wherein said error measurement comprises a comparison between said combinations of Dempster-Shafer bpa's and a set of characteristics of a desired result.

19. The method of claim 12 wherein said updates to said Dempster-Shafer bpa's are calculated using a gradient-descent rule.

20. A method of recognizing an object, comprising the steps of:

gathering a set of information from a sensor, wherein said information is representative of a characteristic of said object;

creating Dempster-Shafer basic probability assignments (bpa's) based on said set of information, wherein said Dempster-Shafer bpa's represent a probability that said object comprises a target;

creating combinations of said Dempster-Shafer bpa's, wherein said combinations of said Dempster-Shafer bpa's represent the probability that said object comprises a target;

measuring an error present in said Dempster-Shafer bpa's and said combinations of said Dempster-Shafer bpa's, wherein said error is calculated according to $(\mu_d - \mu_o)^2$ wherein $\mu_d$ is a desired Dempster-Shafer bpa and $\mu_o$ is a Dempster-Shafer bpa based on said set of information;

calculating updates to said Dempster-Shafer bpa's and said combinations of said Dempster-Shafer bpa's based on said error; and refining said probability of said object comprising a target by modifying said Dempster-Shafer bpa's and said combinations of said Dempster-Shafer bpa's based on said updates.

* * * * *